United States Patent Office 3,577,339
Patented May 4, 1971

3,577,339
FILTRATION METHOD OF SEPARATING LIQUIDS FROM EXTRANEOUS MATERIALS
Justus N. Baird, Jr., Kingston, and James S. Johnson, Kurt A. Kraus, and Joseph J. Perona, Oak Ridge, Tenn., assignors to the United States of America as represented by the United States Atomic Energy Commission
No Drawing. Continuation of application Ser. No. 718,231, Apr. 2, 1968. This application Jan. 29, 1970, Ser. No. 7,387
Int. Cl. B01d 13/00
U.S. Cl. 210—23
3 Claims

ABSTRACT OF THE DISCLOSURE

A cross flow filtration method of separating a liquid from extraneous material comprising establishing a filtering medium comprising a bed of fine particles dispersed on a porous substrate and forcing a liquid across said filtering medium under conditions whereby a portion of said liquid passes through said filtering medium.

This is a continuation of Ser. No. 718,231, filed Apr. 2, 1968, now abandoned.

BACKGROUND OF THE INVENTION

The invention described herein was made in the course of, or under, a contract with the United States Atomic Energy Commission and in the course of work performed for the Office of Saline Water of the United States Department of the Interior.

Our invention relates to filtration methods of separating liquids from extraneous materials.

Hyperfiltration methods have been developed for removing solute from a solution by dynamically forming a solute-rejecting membrane on a porous substrate and then passing a solution over the resulting substrate under conditions whereby a portion of the liquid is forced through the membrane. Copending, coassigned application Ser. No. 504,271, filed Oct. 23, 1965, now abandoned, for "A Salt-Rejecting Barrier," discloses a method of making such a solute-rejecting membrane and a method of separating solutes from a solution. Although an excellent solute-rejecting membrane can be formed on a porous substrate by this method, it has been necessary to use a substrate having an average pore diameter of less than 5 microns and preferably having a narrow pore size distribution. Such a substrate is not only difficult to fabricate, but is easily fouled and difficult to clean.

SUMMARY OF THE INVENTION

It is accordingly one object of our invention to provide an improved filtration method of removing extraneous materials from a liquid.

It is another object to provide a hyperfiltration method of removing solute from a solution using a porous substrate having relatively large pores.

It is another object to provide a hyperfiltration medium which is readily cleaned.

Other objects of our invention will be apparent from the following description and appended claims.

We have discovered that a bed of particles uniformly dispersed onto a porous substrate retains its uniformity and functions as a highly efficient filter under cross flow filtration (filtration wherein a liquid being filtered is pumped across the surface of the filtering medium) even at extremely high cross flow rates.

In accordance with our invention we have provided a filtration method of separating a liquid from a mixture comprising said liquid and extraneous materials, said method comprising establishing a filter medium comprising a thin bed of finely divided particles dispersed on a porous substrate and passing said mixture over the surface of said bed and maintaining a pressure across said filter medium sufficient to force a portion of said liquid through said filter medium.

Our method is especially useful in separation processes wherein a uniform, finely pored structure is necessary such as in processes for separating liquids from colloids and in hyperfiltration methods of removing solute from solutions. It provides a method of removing liquid from solids without producing a thick bed of solids on the filtering medium.

In hyperfiltration methods wherein solute-rejecting membranes are dynamically formed our method permits the use of materials as substrates which previously could not be used because of large or nonuniform pores.

The thin bed of fine particles functions as a finely pored body and unexpectedly remains uniformly distributed on the substrate even in the presence of high cross flow velocity and turbulent fluid flow (velocities parallel to the bed of 10–20 feet per second are frequently desirable) necessary to minimize concentration polarization at the rejecting membrane or to prevent fouling of membranes. The flow rate will ordinarily be greater than 1 foot per second and may reach 100 feet per second. Turbulence promoters may be used to minimize concentration polarization if desired. Fouled membranes can be removed by backwashing and are easily reestablished by providing a new supply of particulates and membrane-forming materials in feed solutions.

As used herein, the term "porous substrate" refers to the coherent permeable base material onto which a thin bed of fine inert particles is deposited. The term "porous support" refers to the combination of a porous substrate and a bed of fine particles onto which a rejecting membrane may be deposited for hyperfiltration methods of removing solute from solution, and "filtering medium" refers to the composite used for filtering, including a rejecting membrane in the case of hyperfiltration processes.

Our method differs from prior filtration methods using filter aids in that our method combines a high cross flow rate with the filter aid and requires only relatively small quantities of the filter aid.

DESCRIPTION OF THE PREFERRED EMBODIMENTS

In carrying out our invention a thin bed of fine particles is deposited onto a porous substrate. The substrate may be of any material compatible with solutions to be in contact with it and may be of any configuration. While our method may be used with a substrate having small uniform pores, its primary advantages are with a substrate having large or nonuniform pores. It is most useful with substrates having pores over 5 microns in diameter and the preferred pore range is 5 to 50 microns in diameter. It is possible to use flexible and woven materials including porous, pressure-resistant hoses, as well as rigid substrates such as porous metals, ceramics, and carbons.

The particles deposited on the substrate surface may be of any material inert to the solutions to be in contact with them, and materials available as filter aids such as diatomaceous earth, perlite, asbestos fibers, cellulose fibers, dried silica gel, and carbon may be used. The particle shape is not critical and it may be spherical, fibrous, or irregular. The preferred particle size may range from 0.01 to 100 microns and is determined by factors such as the pore size of the substrate and the nature of the material to be filtered.

The thin bed may be essentially a monolayer of particles or it may be a multi-layered structure. In some instances, as where a large-pored substrate is to be used to separate a liquid from submicron-size particles, several layers of different-size particles may be desirable. The depth of the bed may range from 0.1 to 100 microns and will nonrmally be controlled by the cross flow rate.

The particles may be deposited on the substrate by passing a dilute slurry (one to several thousand parts per million) of particles over the substrate under conditions where there is a pressure drop across the substrate wall. A thin layer of particles will deposit and remain on the substrate surface even at a high cross flow rate, e.g., a flow of 10–20 feet per second parallel to the substrate surface.

The substrate, together with its coating of fine particles, may be used in hyperfiltration processes, as well as more conventional filtration methods. However, it does not reject solute, but forms a porous support on which a solute-rejecting membrane may be formed by contacting it with a solute-rejecting additive. As is taught in copending application Ser. No. 504,271, a wide variety of materials may be used as a solute-rejecting additive. Example of the substances which may be used are neutral organic polymers, polyelectrolytes, organic ion exchangers, inorganic ion exchangers, and hydrous metal oxides.

Copending application Ser. No. 703,521, filed Feb. 7, 1968, for "Hyperfiltration Method of Removing Organic Solute From Aqueous Solutions," teaches that organic materials may be removed by hyperfiltration techniques, and our method is useful in forming porous supports for hyperfiltration methods of removing organic solute as well as inorganic solute from solutions.

Having thus described our invention, the following examples are offered to illustrate it in more detail.

EXAMPLE I

In a laboratory hyperfiltration apparatus, three tubes were connected in series with means for supplying pressurized feed on the outside and means for collecting the liquid passing through the tube walls. The first tube, made from a compact of spherical mineral particles, had an average pore diameter of 30 microns; the second tube was made of porous stainless steel and had a nominal pore diameter of 5 microns; and the third tube was made of a ceramic and had a nominal pore diameter of 50 microns. A slurry containing .02 pecent by weight of a diatomite filter aid having an average particle diameter of 5.4 microns was pumped past the tube walls, thereby depositing a layer of particles several microns thick on the tube surface. This layer did not reject salt when a solution of 0.025 molar in $MgCl_2$ was pumped over the surface at a pressure of 150 p.s.i. A solution containing hydrous Zr(IV) oxide to form a rejecting membrane was then added to the $MgCl_2$ solution. The degree of $MgCl_2$ rejection and the permeation rate of the tubes in gallons per day per square foot (g.p.d./ft.$^2$) were measured. The data as to permeation rate and rejecting values are given in Table I below.

TABLE I
[Rejection of $MgCl_2$ by hydrous Zr(IV) oxide membrane]

| Tube type | Permeation rate, g.p.d./ft.$^2$ | Rejection, percent |
|---|---|---|
| Compacted mineral particles | 140 | 70 |
| Stainless steel | 100 | 55 |
| Ceramic | 250 | 70 |

As seen from this example, a rejecting membrane having high flow rates and excellent rejection capabiity can be formed from large-pored material with our method.

EXAMPLE II

Three ceramic tubes having nominal pore diameters of 20 microns, 1.4 microns, and 0.6 micron were connected in series as in Example I. An aqueous phase containing 50 to 150 parts per million of a diatomite filter aid having a median particle diameter of 5.4 microns was forced over the outside surface of the tubes. A layer of filter aid particles several microns thick was deposited on the tubes by this technique.

A feed material comprising a solution obtained from a sewage plant after primary treatment was then passed over the resulting tubes. Constituents present in the primary sewage effluent formed a membrane which rejected organic materials. The rejection of chemical oxygen demand for the first tube was between 50 and 70 percent and for the second and third tubes was 90 percent at a transmission rate of 50 to 100 g.p.d./ft.$^2$.

The foregoing example illustrates the formation of a membrane capable of rejecting organic materials on our porous support.

EXAMPLE III

A stainless steel tube having a nominal pore diameter of 5 microns and a tube made from a compact of spherical mineral particles having a nominal pore diameter greater than 30 microns were coated with a diatomite filter aid having a median particle diameter of 5.4 microns by forcing an aqueous phase containing 100 p.p.m. of the filter aid over the outer surface of the tubes. Wash liquors from a sulfite pulping process were then forced past the outer surface of the tubes at a velocity of 3 to 6 feet per second. The rejection of dissolved matter absorbing light having a wave length of 2810 A. was up to 90 percent at permeation rates of 25 to 90 g.p.d./ft.$^2$ for the tube with 30-micron pores and over 80 percent for the tube having 5-micron pores at permeation rates of 10 and 100 g.p.d./ft.$^2$.

Example III illustrates the use of our process in treating a typical pollution control problem.

Example IV is given to illustrate the use of a backwashing technique with our invention.

EXAMPLE IV

In a series of five tests with salt-rejecting membranes dynamically formed of mixed poly(vinyl pyridine) and poly(vinyl pyrrolidone) on a perlite filter aid layer supported in a porous stainless steel tube with 10-micron-diameter pores, the tubes were backwashed with water at a few hundred p.s.i. between the experiments. The permeabilities of the tubes after backwashing were within 30 percent of the original value, while the permeabilities with the membranes in place were a hundred to a thousand times lower. This demonstrates that backflushing can be used to restore permeability if it slows to unacceptably low values because of fouling or other reasons, or a new membrane can be deposited in the event requirements change, e.g., a need to filter a different solute.

EXAMPLE V

A dynamic salt-rejecting membrane was developed on a section of a fire hose jacket with outside diameter 1.28 inches. The hose was made of cotton with warp yarn 8/7, warp ends 126, filler yarn 8/22, filler picks 10.5/in. A section of this hose was clamped in a hyperfiltration apparatus. It was then coated on the inside by passing through it an aqueous suspension of various grades of a diatomaceous earth filter aid. The deposition was carried out at an axial flow rate (across flow velocity) of 3.3 feet/second. Three grades of filter aid were used in succession. The median particle diameter of the first grade was 30 microns; that of the second grade was 20 microns; and that of the third grade was 10 microns. The concentration of filter aid in the suspension was approximately 40 mg./liter.

After preparing this porous multi-layered support, a .02 molar $MgCl_2$ solution was circulated which contained $4 \times 10^{-4}$ molar hydrous zirconium(IV) oxide prepared by hydrolysis of zirconium oxychloride. Within 16 hours salt rejection was 62 percent and after approximately 40 hours salt rejection was found to be over 80 percent at an axial circulation velocity of 16 ft./sec. Flux through the filtering medium was 0.45 cm./min. (160 g.p.d./ft.$^2$) at 200 p.s.i. applied pressure.

This example illustrates the use of woven materials as porous substrates in combination with filter aids and dynamic membranes for rejection of dissolved materials. It also illustrates that such arrangements can be used to remove larger particles from solution. It is clear that other hose materials could be used such as those prepared from synthetic fibers, glass fibers, with the only restriction being that the fibers not be attacked by the solutions with which they come in contact. Also, other types of weaves capable of retaining the filter aid would be satisfactory.

The foregoing examples are intended to illustrate, not to limit, our invention, which should be restricted only in accordance with the following claims.

We claim:

1. An improved hyperfiltration process for purifying water by removing solute impurities from an aqueous solution containing said impurities and an aqueous-soluble solute rejecting material which comprises:
   (a) depositing, to a bed depth of from 0.1 to 100 microns, an inert non-solute-rejecting filter aid material on a porous substrate which contains pores large enough to allow passage of water with a minimum pressure drop, said material having a particle size in the range of from 0.01 to 100 microns; and
   (b) passing said solution over the surface of said bed in cross-flow to form a solute rejecting membrane of said material on said bed while maintaining a velocity and a pressure drop across said bed sufficient to force said solution therethrough and allow collection of an aqueous solution depleted in solute impurities.

2. A process for removing organic impurities which are dissolved in an aqueous feed solution selected from primary sewage effluent or sulfite pulping wash liquors which comprises depositing, to a depth of from 0.1 to 100 microns, particles of an inert non-solute-rejecting filter aid material on the internal or external surface of a porous tubular surface, said particles having a size in the range 0.01 to 100 microns, passing said feed solution across the deposited surface while maintaining a velocity parallel to and a pressure across said bed sufficient to collect an aqueous solution issuing from the non-deposited surface of said tube which is depleted in organic impurities.

3. The process according to claim 2 in which the inert filter aid material is selected from the group consisting of diatomaceous earth, perlite, asbestos, cellulose, and carbon.

References Cited

UNITED STATES PATENTS 3,462,362   8/1969   Kollsman.

FRANK A. SPEAR, Jr., Primary Examiner

U.S. Cl. X.R.

210—75, 321